United States Patent
Shafer

(10) Patent No.: US 8,120,462 B2
(45) Date of Patent: Feb. 21, 2012

(54) METHOD AND SYSTEM FOR STANDING WAVE DETECTION FOR RADIO FREQUENCY IDENTIFICATION MARKER READERS

(75) Inventor: Gary Mark Shafer, Boca Raton, FL (US)

(73) Assignee: Sensomatic Electronics, LLC, Boca Raton, FL (US)

( * ) Notice: Subject to any disclaimer, the term of this patent is extended or adjusted under 35 U.S.C. 154(b) by 1043 days.

(21) Appl. No.: 11/526,542

(22) Filed: Sep. 25, 2006

(65) Prior Publication Data

US 2008/0074268 A1    Mar. 27, 2008

(51) Int. Cl.
*H04Q 5/22* (2006.01)
(52) U.S. Cl. ..................................... 340/10.1
(58) Field of Classification Search ............ 340/10.1, 340/572.1–572.9, 825, 540, 500, 505, 561, 340/57.12, 12.51; 235/492
See application file for complete search history.

(56) References Cited

U.S. PATENT DOCUMENTS

| | | | |
|---|---|---|---|
| 5,471,146 A | 11/1995 | Krayeski et al. | |
| 7,193,504 B2 * | 3/2007 | Carrender et al. | 340/10.4 |
| 7,253,717 B2 * | 8/2007 | Armstrong et al. | 340/10.2 |
| 7,397,321 B2 * | 7/2008 | Hyun et al. | 333/1.1 |
| 2002/0109593 A1 * | 8/2002 | Swartzel et al. | 340/540 |
| 2002/0131580 A1 * | 9/2002 | Smith | 340/540 |
| 2004/0124248 A1 * | 7/2004 | Selker | 235/492 |
| 2006/0170553 A1 | 8/2006 | Bierach | |
| 2006/0192655 A1 * | 8/2006 | Levin | 340/10.2 |
| 2006/0202033 A1 * | 9/2006 | Campero et al. | 235/436 |

FOREIGN PATENT DOCUMENTS

| | | |
|---|---|---|
| EP | 0944014 A2 | 9/1999 |
| EP | 0944014 A3 | 6/2001 |
| GB | 2395627 A1 | 5/2004 |

\* cited by examiner

*Primary Examiner* — Vernal Brown
(74) *Attorney, Agent, or Firm* — Alan M. Weisberg; Christopher & Weisberg, P.A.

(57) ABSTRACT

A method and system for determining the absence and presence of items in an RFID interrogation zone. At least one RFID reader transmits interrogation signals in an interrogation zone. Each RFID reader transmits interrogation signals having a forward amount of RF energy and receives response signals from the items in the interrogation zone having a reflected amount of RF energy. A detection circuit determines the presence and absence of items within the interrogation zone based at least in part on the reflected amount of RF energy.

12 Claims, 4 Drawing Sheets

METHOD AND SYSTEM FOR STANDING WAVE DETECTION FOR RADIO FREQUENCY IDENTIFICATION MARKER READERS

CROSS-REFERENCE TO RELATED APPLICATION n/a

STATEMENT REGARDING FEDERALLY SPONSORED RESEARCH OR DEVELOPMENT n/a

BACKGROUND OF THE INVENTION

1. Statement of the Technical Field

The present invention relates to radio frequency identification ("RFID") systems and more particularly to a system and method for detecting the presence and absence of items in a given RFID interrogation zone.

2. Description of The Related Art

Radio frequency identification ("RFID") is a term used to describe technologies that use radio waves to automatically identify objects or people. RFID systems are used for many applications such as managing inventory, electronic access control, security systems, automatic identification of cars on toll roads, article surveillance, etc. RFID implementations are accomplished in several ways. The most popular involves storing a serial number that identifies an object or a person, and perhaps other information, on a microchip in communication with a transponder. This arrangement is commonly referred to as an RFID marker or RFID tag. RFID systems may be used to track or monitor the location and/or status of articles or items to which an RFID marker is applied.

An antenna, sometimes packaged with a transceiver and decoder, provides the ability to receive and convert the radio waves reflected back from the RFID marker into digital information that can then be passed on to computers for processing. The antenna, the transceiver and the decoder are often collectively referred to as the RFID reader. The RFID reader enables transmission of an interrogation signal to the RFID marker to obtain identification information. Based on the interrogation signal, the RFID reader also receives signals from the marker bearing the identification information. The region in which an RFID reader can detect the presence of RFID markers is referred to herein as an "interrogation zone".

Signals received by RFID readers in the form of backscatter modulation are typically analyzed in order to obtain marker identification information from the interrogated markers. While this leads to readers that are designed to be sensitive to reflected energy, normally, extraneous reflections unrelated to the identity of the marker, are removed or mitigated in some way by the receiver portion of the RFID reader.

In some RFID systems, items which are to be monitored are stacked near each other or one on top of another, on shelves or other limited-space locations. Often, there may be a need to determine when some or all of the items on the shelf have been removed. For example, in a music store, a shelf might contain many compact discs. As customers remove discs and take them to the cashier for purchase, the supply will run low and management should be made aware of this so the purchased discs can be replaced on the shelf. Or, in a warehouse, boxes containing items may be stored on shelves. Again, as these boxes are taken off the shelves, it is important to note this since new replacement items may have to be ordered.

In close-quarter interrogation zones such as on a shelf, items may be in close proximity to the RFID reader antenna. It is sometimes necessary to use a higher power than normal to transmit and receive through all items in a stack in order to read items at, for example, the top of the stack. However, because there are often multiple RFID interrogation systems situated near each other, if it is determined that items have been removed from a monitored zone, the RF energy in that zone is now free to propagate throughout the zone and to surrounding areas causing interference with other nearby RFID interrogation systems.

Therefore, what is needed is a method and system that can be used to accurately determine when items within an RFID interrogation zone are being depleted and to take corrective action such as initiating processes to replenish the removed items and/or reduce the power of the RFID readers to conserve costs and to reduce the likelihood of interference with other RFID readers.

SUMMARY OF THE INVENTION

The present invention addresses the deficiencies in the art with respect to RFID readers and RFID systems. An RFID system includes one or more RFID readers in communication with one or more RFID markers, creating an interrogation zone. Each RFID marker can be applied to an item of interest. Each reader includes an antenna that transmits interrogation signals to the markers, and the markers return signals containing information typically relating to the marker or the item being interrogated. Each RFID reader antenna transmits RF energy (forward RF energy) into the interrogation zone, and receives RF energy (reflected RF energy) from the interrogated markers and from other items in the zone. A detection circuit can be inserted between the antenna and the RFID reader in order to detect the reflected and the forward RF energy, at the antenna. The relationship between the forward and the reflected RF energy is directly related to items that are in the interrogation zone. Analyzing this relationship can provide information relating to items in the zone and whether they are being removed therefrom.

According to one aspect, the present invention provides a system for determining the absence and presence of items in an RFID interrogation zone in which an RFID reader transmits interrogation signals in an interrogation zone. The RFID reader transmits interrogation signals having a forward amount of RF energy and receives response signals from the items in the interrogation zone having a reflected amount of RF energy. A detection circuit determines the presence and absence of items within the interrogation zone based at least in part on the reflected amount of RF energy.

In accordance with another aspect, the present invention provides a method for determining the absence and presence of items within an RFID interrogation zone. Interrogation signals are transmitted within the interrogation zone, the interrogation signals having a forward RF energy. Responsive signals are received in response to the transmitted interrogation signals, the response signals having a reflected RF energy. The reflected RF energy is analyzed to determine whether any items within the interrogation zone have been removed.

In accordance with yet another aspect, the present invention provides an reader for determining the absence and presence of items in an RFID interrogation zone. An RF source generates RF signals. An antenna is coupled to the RF source.

The antenna transmits forward RF energy within the RFID interrogation zone. A receiver receives reflected RF energy from items in the RFID interrogation zone. A detection circuit compares an amount of the reflected RF energy with an amount of the forward RF energy at the antenna to obtain a standing wave ratio. The standing wave ration is usable to determine whether items have been removed from the interrogation zone.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention advantageously provides a system and method that determines the presence or the absence of items within an RFID interrogation zone by detecting the energy reflected back by items within the zone and comparing the reflected energy with the energy propagated from the antenna of an RFID reader.

In an RFID interrogation system, RF energy is transmitted from the RFID antenna to the markers in order to obtain identification information. The RFID markers respond to the transmission from the RFID reader by transmitting response signals to the RFID reader. In certain instances, such as on a shelf, items are often stacked on top of each other, in close proximity to RFID readers or antennas. Normally, the RFID reader is only concerned with response signals that carry the identity of the interrogated marker and tend to ignore or filter out other signals. The present invention detects the energy reflected back to the RFID antenna from items within the interrogation zone and compares its level to the level of the forward energy emitted by the antenna.

When items situated near the RFID antenna are removed from the interrogation zone, the cumulative amount of reflected RF energy detected by the RF antenna is altered. Typically, in this scenario, the ratio of the reflected energy to the forward energy decreases, indicating the removal of items within the interrogation zone. Action can then be taken to replenish the items, and/or to decrease the transmission power of the RFID antenna to conserve energy and/or reduce the likelihood of interfering with other nearby RFID readers.

Figure 1:
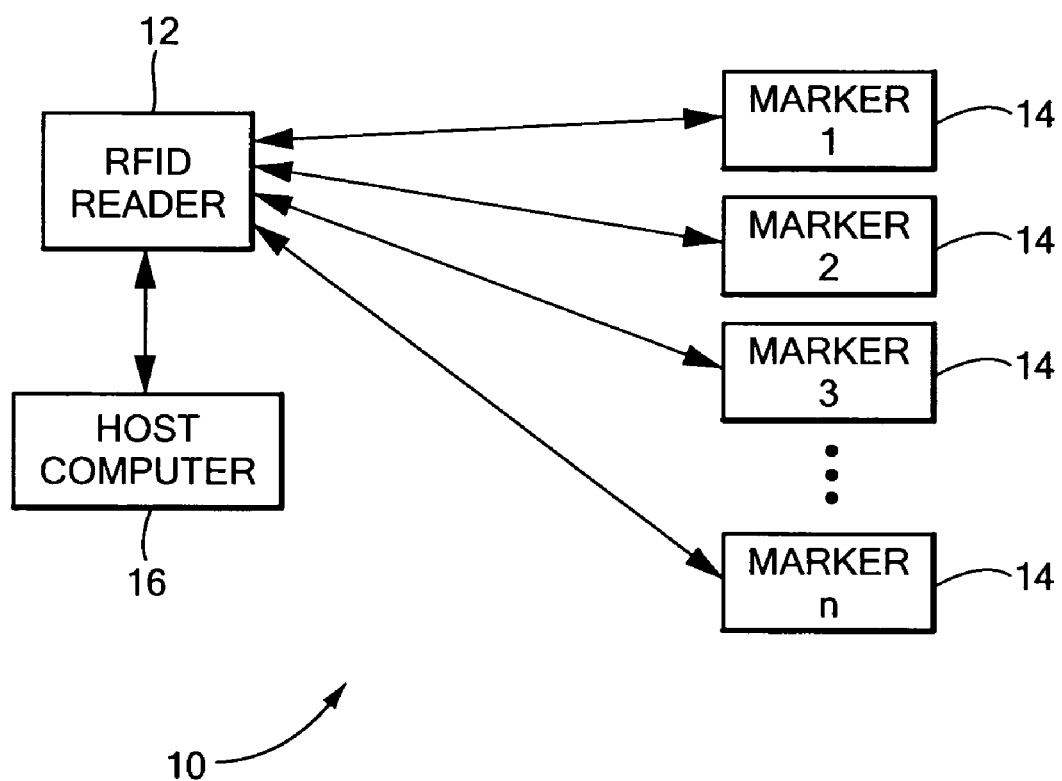
FIG. 1 is a diagram of an RFID system constructed in accordance with the principles of the present invention.

Referring now to the drawing figures in which like reference designators refer to like elements there is shown in FIG. 1 a system constructed in accordance with the principles of the present invention and designated generally as "10." System 10 is an RFID interrogation system and includes one or more RFID readers 12, one or more RFID markers 14 affixed to various items, and a host computer 16. Host computer 16 may be situated at a remote location, away from system 10, but is in electrical communication with RFID reader 12.

RFID markers 14 come in wide varieties of shapes and sizes. Markers 14 can be either active or passive. Active markers are powered by an internal battery and the data received by these types of markers can be modified or written over. The memory size of an active marker varies according to the application requirements. Passive markers operate without an external power source and obtain their operating power from a signal transmitted from the reader. Thus, passive markers 14 are typically much lighter and less expensive than active markers. However, passive markers typically have a shorter read range when compared to active markers, and require a high-powered reader to activate them.

RFID reader 12 (discussed in greater detail below) typically includes a transceiver, a decoder and an antenna, and may be a handheld device or a fixed-mount device. Reader 12 communicates with each marker 14 by transmitting, via an antenna, radio signals to one or more markers 14. Signals are propagated throughout the interrogation zone at a particular RF energy level ("forward energy"). Markers 14 that receive these signals within the interrogation zone, return a signal that includes identification information about the item to which marker 14 is affixed. The antenna is used to transmit signals to and receive signals from markers 14. Antennas may be part of reader 12 or may be separately mounted within, for example, a door frame, a pedestal, or on a shelf stacked with items. The marker 14 being interrogated returns identification information to reader 12 by transmitting RF signals to the reader's antenna at a particular RF energy level ("reflected energy"). The received signals are then processed via a digital signal processor within reader 12, or via a host computer 16.

Figure 2:
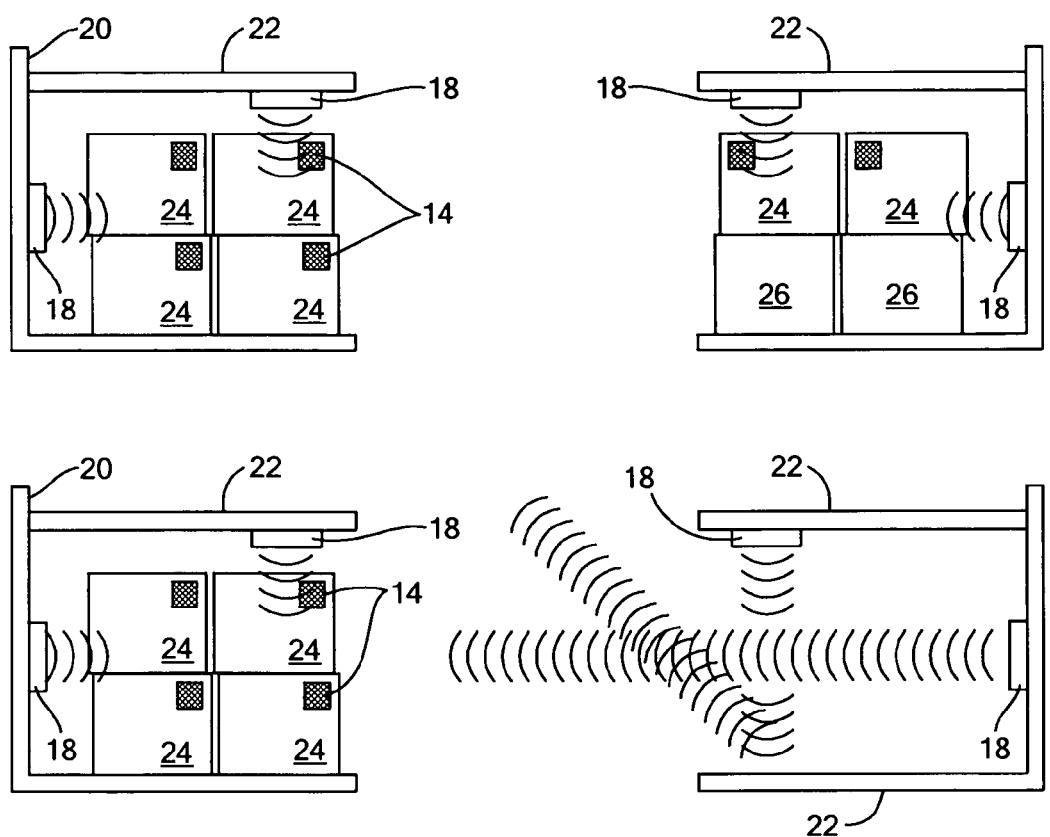
FIG. 2 is a diagram of an RFID system incorporating the present invention and illustrating one application of the present invention.

FIG. 2 illustrates an exemplary scenario where the present application may be applied. FIG. 2 illustrates an exemplary interrogation zone where multiple RFID antennas 18 are affixed within a relatively confined area containing multiple stacks of boxes. It should be noted that RFID readers 12 may be used rather than just the antennas 18. The area shown in FIG. 2 defines a confined RF interrogation zone and may include, for example, two closely situated, opposing shelves 20 and 22. Each shelf 20 and 22 includes marked items 24 (items to which a marker 14 is affixed), but may also include some unmarked boxes 26, containing a particular retail item. It may be desirable to determine when the items in boxes 24 or 26 have been moved from the storage area.

The antennas 18 proximate the unmarked boxes 26 transmit RF interrogation signals within the interrogation zone and await the receipt of communication signals from each interrogated marker. The presence of boxes 26 within the interrogation zone, i.e., between the shelves 20 and 22, contribute to the total magnitude of RF energy reflected back to transmitting antennas 18. However, as marked items 24 or unmarked boxes 26 are removed from the interrogation zone, the detected reflected energy from the RFID markers at antennas 18 is altered. By receiving and measuring the magnitude of the reflected signals, antennas 18 receive information that can be used to determine the removal of items within the interrogation zone.

The scenario presented above is useful when it is important to determine the inventory of a particular item, such as the items within boxes 26. Once it has been determined that the stock of a particular item is being or has been depleted, further action can be taken. For example, a notation can be made to order more of a particular item. If there are replacement items in inventory, these items can replace the removed items, thus maintaining a threshold amount of this particular item in the storage area. Advantageously, when no items are remaining on the storage shelves, the RF power transmitted from the interrogating antenna 18 can be temporarily lowered or even eliminated, since it has already been determined that the stock of boxes has been depleted and, at least for the time being, there is no longer a need to monitor their presence. By lowering or eliminating the RF energy from the antenna 18 for the time being, there is no longer the problem of interference with other RFID readers that may be nearby. Further, power can be conserved and ramped up again when the boxes have been replenished and there is once again a need to monitor their presence in the interrogation zone.

Figure 3:
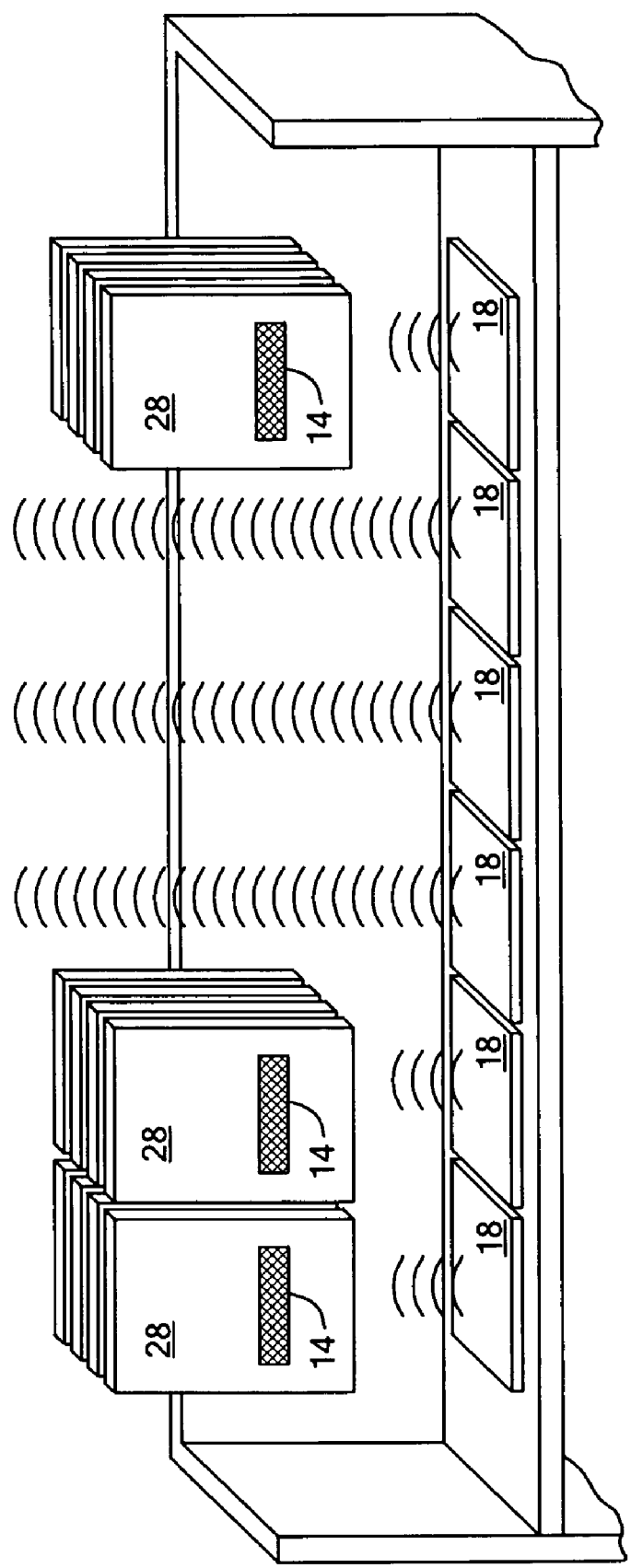
FIG. 3 is a diagram of an RFID system incorporating the present invention and illustrating another application of the present invention.

FIG. 3 illustrates yet another exemplary implementation of the present invention. Here, shelves at a local retail store contain multiple compact discs or DVDs 28 for sale. Within each shelf are rows of discs 28 and antennas 18. RFID markers 14 may be affixed to one or more discs 28. The present invention determines when items within an interrogation zone are absent or are present irrespective of whether the items contain RFID markers 14 or not. One or more antennas 18 can be situated at various locations within the shelf. Each antenna 18 within the shelf is arranged to constantly transmit interrogation signals to the RFID markers 14 within the shelf. Each antenna 18, or a receiver within an RFID reader 12, in addition to receiving identification response signals from each RFID marker 14, also receives a certain cumulative level of reflected RF energy. Because of the close proximity between antennas 18 and the items within the interrogation zone, antenna 18 is able to detect changes in the return or reflected RF energy when a given number of items are removed from the zone.

In an exemplary embodiment of the present invention, each shelf contains CDs 28 from a particular musical artist. As customers remove these discs from the shelf, the antennas 18 detect a decrease in the total reflected energy within the shelf due to the absence of disks 28. This total amount of RF energy can be compared to the forward RF energy transmitted by antennas 18 in order to obtain a ratio of reflected energy to transmitted energy. The present invention uses this ratio to determine the presence and absence of items within a particular interrogation region. Thus, when all discs 28 of a particular artist have been removed from the shelf, a significant decrease in reflected RF energy is detected at antenna 18 and action can be taken to replenish the shelf with replacement discs 28 for that artist.

Figure 4:
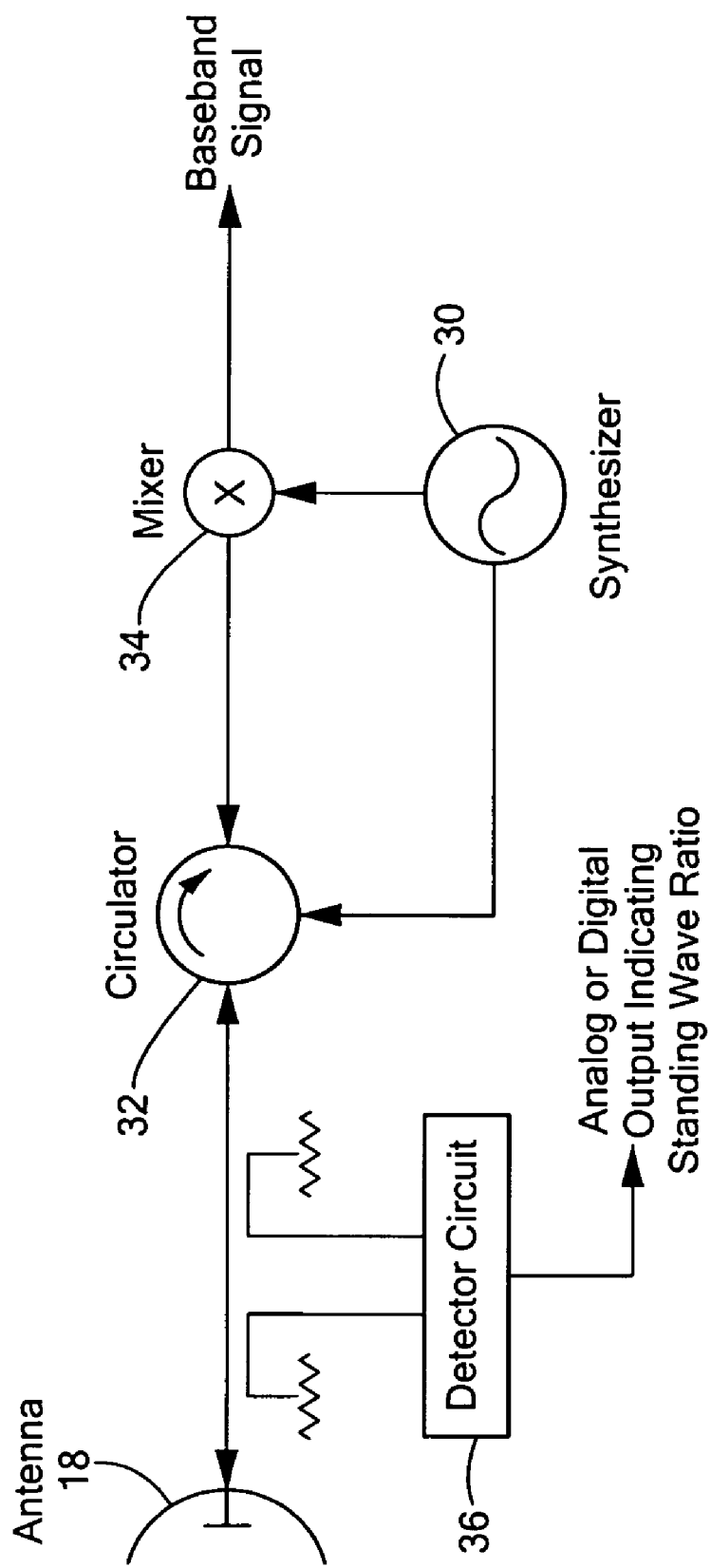
FIG. 4 is a diagram of a portion of an RFID reader constructed in accordance with the principles of the present invention.

FIG. 4 illustrates the front end of an exemplary RFID reader 12 used in connection with the present invention. It should be noted that the reader 12 illustrated in FIG. 4 is an exemplary reader 12 that is used in a typical RFID interrogation system of the present invention and the invention disclosed herein is not limited to a particular design or type of RFID reader 12. Reader 12 includes an RF source 30, which supplies the radio frequency signal. Circulator 32 is of the type commonly known in the art, and assists in directing the RF signal to and from antenna 18. Signals arriving at antenna 18 may be sent to mixer 34 where, if necessary, the frequency of the incoming RF signal is converted to a different frequency. Antenna 18 transmits radio signals to one or more markers 14 within an interrogation zone. Antenna 18 may be configured as a transceiver antenna with an associated controller that provides control and switching to switch from transmitting to receiving functions at predetermined time intervals. Those skilled in the art will recognize that there may be separate transmitting and receiving modules within antenna 18.

Antenna 18 emits electromagnetic radio frequency interrogation signals throughout an interrogation zone to create an electromagnetic field. The electromagnetic field produced by antenna 18 can be constantly present in instances where one or more markers 14 are present. If constant interrogation is not needed, the electromagnetic field can be activated intermittently. The electromagnetic field of interrogation signals established by antenna 18 will cause a response from the interrogated marker 14. Further, a portion of RF energy emitted by antenna 18 is reflected back to the receiving module within reader 12 or the transceiver module of antenna 18. Thus, at antenna 18, a cumulative magnitude of RF energy reflected back from markers 14 can be detected.

A detector circuit 36 is positioned between the antenna 18 and the front end receiver portion of reader 12. Detector circuit 36 includes circuitry that detects both the forward RF energy transmitted by antenna 18 and the reflected RF energy received back from the markers 14 at antenna 18. By detecting both the forward and the reflected RF energy at antenna 18, detector circuit 36 is able to receive information needed to compute the standing wave ratio ("SWR") at antenna 18. The standing wave ratio is the ratio of the reflected wave perceived at antenna 18 to the transmitted forward wave at antenna 18. A signal corresponding to the SWR value can be forwarded to a signal processing portion of reader 12, to host computer 16, or to some other signal processing module where the information can be used to determine the presence and absence of items within the interrogation zone. The detection circuit 36 continually monitors changes in the standing wave ratio and forwards a signal representing the changes in the standing wave ratio to a processor for determining if items have been removed from the interrogation zone.

For example, reader 12 is powered up and begins transmitting interrogation signals within a given interrogation zone. An initial reading at antenna 18 can provide the total amount of RF energy being transmitted. Because of the close proximity between antenna 18 and both marked and un-marked items within the zone, a recordation can be taken as to the total amount of RF energy being reflected back to antenna 18 by all the items within the interrogation zone. Thus, an initial SWR can be determined. As items between antenna 18 and markers 14 within the interrogation zone are removed, the SWR will increase, and the processor being used to calculate the SWR can use predetermined logic to determine if the inventory of items in the interrogation zone have been or are about to be depleted. When a certain predetermined threshold item level is reached, further action can be taken including, but not limited to, replenishing the depleted items, transmitting a notification to another entity that item depletion has occurred or is about to occur and additional items should be ordered, or reducing the intensity of the reader's transmitting power.

Detection circuit 36 may include a dual directional coupler or other type of coupling device capable of sensing both forward and reflected RF energy. It should be noted that the detection circuit 36 of the present invention is not limited to a particular hardware configuration and may incorporate any hardware or software that enables it to detect both forward and reflected RF energy at the antenna 18, whether antenna 18 is part of reader 12 or not. It is also contemplated that detection circuit 36 may be inserted anywhere in the RF path between antenna 18 and the front-end RFID reader 12 and may be incorporated as part of reader 12 or implemented as a separate hardware component.

Detection circuit 36 may include the necessary hardware and/or software necessary to calculate the real-time SWR at antenna 18, or, instead, may provide an output SWR signal, either analog or digital, that indicates the present forward and reflected RF energy levels. This signal is forwarded to a processing unit, which can be within reader 12 or within a separate unit such as computer 16, which calculates the current SWR at antenna 18. If a certain threshold SWR is reached, a signal can be directed back to reader 12, instructing it to reduce or shut off the transmitting power of antenna 18, until further direction is received.

In an alternate embodiment of the invention, the alternating current ("AC") or the direct current ("DC") component of the baseband signal can be examined as a relative indicator of the SWR. For example, rather than inserting detection circuit 36 between antenna 18 and reader 12, signals present at mixer 34 can be analyzed. If the marked items within the interrogation zone are not moving, the standing wave signal at mixer 34 resembles a DC signal. The magnitude of this DC signal tends to correlate with the SWR. In other words, the DC signal at this point (post-mixer) provides a relative indication of the signal power being reflected back into the receiver portion of reader 12. This information can be processed in order to determine if items in the interrogation zone have been removed.

The present invention provides a perpetual inventory system that incorporates the basic components of an RFID interrogation system, i.e., a reader, a transmitting and receiving antenna, and one or more RFID markers, although there need not be RFID markers present in order to utilize the present invention. The basic components are used along with detection circuitry that measures the magnitude of the forward and reflected RF signals, at the antenna, in order to determine if items within the RFID interrogation zone have been removed. By determining if items have been removed, replacement items can be ordered, and/or the power of the RFID reader and/or antenna can be lowered in order to conserve power, save money and reduce the chance of interference with adjacent RFID interrogation systems. The present invention determines the presence and absence of items in the interrogation zone by determining the standing wave ratio at the antenna or by analyzing the power reflected back to the reader by measuring the AC or DC component of the RF baseband signal.

The present invention can be realized in hardware, software, or a combination of hardware and software. An implementation of the method and system of the present invention can be realized in a centralized fashion in one computer system or in a distributed fashion where different elements are spread across several interconnected computer systems. Any kind of computer system, or other apparatus adapted for carrying out the methods described herein, is suited to perform the functions described herein.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

I claim:

1. A method for determining the absence and presence of items within an RFID interrogation zone, the method comprising:
transmitting interrogation signals within the interrogation zone, the interrogation signals having a forward RF energy;
receiving responsive signals in response to the transmitted interrogation signals, the response signals having a reflected RF energy;
analyzing the reflected RF energy to determine whether any items within the interrogation zone have been removed, the analysis including determining a ratio between the amount of reflected RF energy and the amount of forward RF energy.

2. The method of claim 1, wherein analyzing the reflected RF energy includes correlating a DC component of the responsive signals with the ratio.

3. The method of claim 1, wherein analyzing the reflected RF energy includes analyzing an AC component of the responsive signals.

4. The method of claim 1, further comprising:
comparing the reflected RF energy with the forward RF energy; and
determining if items within the interrogation zone have been removed based on the comparison of the reflected RF energy with the forward RF energy.

5. The method of claim 4, further comprising determining if items within the interrogation zone have been removed based on the ratio of the reflected RF energy and the forward RF energy.

6. The method of claim 5, further comprising providing an output signal representing the ratio of the reflected RF energy and the forward RF energy.

7. The method of claim 6, further comprising processing the output signal in order to determine the presence and absence of the items within the interrogation zone.

8. The method of claim 1, wherein if it is determined that items are not present within the interrogation zone, further comprising providing instructions to replenish the items.

9. The method of claim 1, wherein if it is determined that items are not present within the interrogation zone, reducing the transmitting power of the interrogation signals.

10. The method of claim 4, wherein comparing the reflected RF energy with the forward RF energy is performed by detection circuitry located within an RFID reader.

11. An RFID reader for determining the absence and presence of items in an RFID interrogation zone, the reader comprising:
an RF source for generating RF signals;
an antenna coupled to the RF source, the antenna transmitting forward RF energy within the RFID interrogation zone;
a receiver for receiving reflected RF energy from items in the RFID interrogation zone; and
a detection circuit, the detection circuit comparing an amount of the reflected RF energy with an amount of the forward RF energy at the antenna to obtain a standing wave ratio, the standing wave ratio usable to determine if items have been removed from the interrogation zone, the detection circuit providing an output signal representing a ratio between the amount of reflected RF energy and the amount of forward RF energy.

12. The RFID reader of claim 11, further comprising a processor, wherein the detection circuit monitors changes in the standing wave ratio and forwards a signal representing the changes in the standing wave ratio to the processor, the processor determining if items have been removed from the interrogation zone.

* * * * *